United States Patent [19]

Siligoni et al.

[11] Patent Number: 4,677,664
[45] Date of Patent: Jun. 30, 1987

[54] METHOD AND APPARATUS FOR AN IMPROVED RING TRIP DETECTION TELEPHONE CIRCUIT

[75] Inventors: Marco Siligoni, Vittuone; Vanni Saviotti, Monza, both of Italy

[73] Assignee: SGS Microelettronica S.p.A., Milan, Italy

[21] Appl. No.: 673,527

[22] Filed: Nov. 21, 1984

[30] Foreign Application Priority Data

Nov. 23, 1983 [IT] Italy ............................. 23832 A/83

[51] Int. Cl.⁴ ........................................... H04M 3/02
[52] U.S. Cl. ..................................... 379/382; 379/385
[58] Field of Search ........... 179/18 FA, 18 HB, 84 R, 179/84 A

[56] References Cited

U.S. PATENT DOCUMENTS

| | | | |
|---|---|---|---|
| 3,829,619 | 8/1974 | Close et al. ..................... | 179/18 HB |
| 4,110,569 | 8/1978 | Schindler et al. ................ | 179/84 A |
| 4,355,206 | 10/1982 | Israel et al. ..................... | 179/18 HB |
| 4,356,355 | 10/1982 | Ferrieu et al. ................... | 179/18 HB |
| 4,362,908 | 12/1982 | Melindo ......................... | 179/18 HB |
| 4,396,805 | 8/1983 | Wagner .......................... | 179/18 FA |

Primary Examiner—Thomas W. Brown
Attorney, Agent, or Firm—Harry M. Weiss & Associates

[57] ABSTRACT

A telephone circuit for ring trip detection that can be monolithically integrated, includes a current transducer coupled to a user's telephone line, and an integrator circuit. The output current of the current transducer is proportional to the line current until equal and opposite threshold values are reached. When the line current threshold values are exceeded, the transducer output current is constant. The transducer output current is integrated by the integrator circuit over at least one complete cycle. When a telephone headset is removed, a direct current is applied to the ringing signal current resulting in asymmetry in the half-cycles of the transducer output current. The asymmetry provides a non-zero integrated current for a complete cycle. When the integrated value of the asymmetrical current is greater than a selected value, a signal is applied to the ringing circuit, halting the ringing signal.

3 Claims, 3 Drawing Figures

METHOD AND APPARATUS FOR AN IMPROVED RING TRIP DETECTION TELEPHONE CIRCUIT

BACKGROUND OF THE INVENTION

1. Field of the Invention

The present invention relates generally to telephone circuits for ring trip detection and, more particularly, to monolithically integrated telephone circuits for ring trip detection that can constitute an interface between the user's telephone line and the user's circuit line under the control of the telephone exchange control equipment.

2. Discussion of the Related Art

A user's telephone apparatus is coupled to the telephone exchange by means of a line whose terminals are coupled in parallel both to the conversation circuit and the ringing mechanism.

A switch is coupled in series with the conversation circuit which is turned off when an off-hook condition, i.e. when the receiver or headpiece is removed from the body of the telephone, takes place. A capacitor is coupled in series with the ringing mechanism to decouple the ringing mechanism from the direct current line. The direct current line is in fact powered by a direct current generator coupled in series with an alternating current generator which represents the ringing signal generator when the telephone exchange control equipment sends a call signal to the user. Therefore, when there is call, a d.c. component superimposed on a ringing alternating current appears on the line in the off-hook condition.

The ringing signal generally has a frequency of 25 or 50 Hz, with an effective voltage value rather high (60 V to 80 V) relative to the normal telephone conversation signals. If the ring signal is not immediately interrupted at the moment of the off-hook, it is converted by the conversation circuit to a high intensity acoustical signal, which can be detrimental to the hearing of the user.

When electronic circuits have been introduced for the detection of the off-hook condition directly in the user's circuits in the exchange, the problem has risen in recognizing immediately the off-hook condition from the variations of the line current by sensing a possible presence of a d.c. component on the user's telephone line in order to be able to interrupt in a timely manner the generation of the ringing signal. With this recognition, the central control equipment can interrupt the sending of call signals.

In effect, it is not easy to execute such a sensing when the a.c. current due to the ringing signal has an effective value much larger than the value of the direct current present after the off-hook condition is established. The large diversity of impedances that can exist in the various lines and the user's telephone apparatus also makes it necessary to design circuits for the ring trip detection that have sufficient sensitivity, taking into account the worst case that can be established. If the line current is only in the alternating state when the off-hook has not yet occurred in the ringing phase, the line current wave form is comprised of a succession of positive and negative parts which are symmetric in respect to the zero amplitude reference. This symmetry occurs even when the wave form is not perfectly sinusoidal as, for example, when there are non-linear components in the electric circuits coupled to the line.

Therefore, the duration time of the half-waves of current, positive and negative, are equal. The areas defined by the wave form in the positive and negative half-waves are equal.

When the off-hook condition takes place and the conversation circuit direct current is added to the alternating current of the ringing signal in the half-wave periods in which the sign of the alternate current is equal to that of the direct current, the peaks of the wave form of the line current in which the alternating current and the direct current are found to be larger than those peaks in which the alternating current and the direct current have opposite signs.

Therefore, when the off-hook condition occurs, the positive half-wave periods of the line current in the ringing phase have a different duration than that of the negative half-wave periods. The area defined by the wave form of the current in the positive half-wave periods also is found to be different from that of the negative half-wave periods. The difference in these parameters are determined by the amplitude of the direct current. Two distinct procedures are utilized in the related art for the ring trip detection. They are based on the detection of the differences between the positive half-wave and the negative half-wave of the line alternating currents as altered by any direct current component.

A first procedure based on a comparison of the duration times of the positive and negative half-wave periods for one or more periods is, for example, made by counting the number of impulses having a predetermined duration time that can occur in each half-wave periods with one of the methods known to a person skilled in the art. The control devices that actuate such procedure do not however guarantee a sure detection of the off-hook condition in all of the conditions of the telephone network that can arise in practice. In fact, in a telephone line, some stray current is always present that, added to the line alternating current, can shift the point of separation between the positive and negative half-wave periods of the current wave form or make the position of this point uncertain. In this way, an "indetermination interval" of the detection is created whose amount depends on stray current which, in turn, depends on the different lengths and impedances of the lines. Therefore, such control devices can be effectively utilized only when the conditions of the line guarantee an indetermination interval under predetermined values.

The second procedure is actuated by measuring, during one or more periods, the total area defined by the wave form, attributing a positive value to the positive peak area and a negative value to that of the negative peak area. If the value of the total area is not equal to zero and exceeds a predetermined threshold value for certain detection, this value signifies that there is a direct current component in the line alternating current, i.e. the off-hook has taken place, and a command can be given to the exchange equipment, to interrupt the sending of call signals. Such a measure, defined as a measure of an "average value", can be effected by means of an integrator circuit that generates a signal proportional to the integral of the line current for one or more full periods. The generated signal has a zero value, or a value under a predetermined threshold only when, in the ringing phase, the off-hook condition has not yet taken place.

Such an integrator, as is well known to a person skilled in the art, can be realized simply with a RC type network. When, however, monolithically integrated telephone circuits are used to actuate this second procedure, there is a problem of sensitivity of the recognition device. In fact, for the integration during one or more periods, the signal value generated by the integrator during the period can be much higher than the final value that indicates an eventual off-hook condition and, especially when the line current is not perfectly sinusoidal, and has high peaks, the signal value can not be compatible with the limited dynamics of the integrated circuits that are used. On the other hand, because the off-hook direct current has a much lower value than the ringing alternate current, the line current cannot be altered without lowering the sensitivity of detection.

SUMMARY OF THE INVENTION

It is therefore an object of the present invention to provide a monolithically integrated telephone circuit for the ring trip detection adapted to be used as an interface between a user's telephone line and a user's circuit line under the control of the exchange control equipment.

It is a further object of the present invention to provide a circuit for ring trip detection with a high certainty of detection of the off-hook in all of the different telephone network conditions and as compared with the known circuits in a larger field of use.

The aforementioned and other objects are accomplished, according to the present invention, by a telephone circuit for the ring trip detection that includes a current transducer circuit (TR) coupled to a user's telephone line and supplying a current ($I_T$) proportional to the current of the line ($I_L$) for current values included between two predetermined threshold values, opposite in sign and equal in absolute value. When these threshold values are achieved, the current ($I_T$) supplied by the transducer (TR) is maintained constant as the line current ($I_L$) varies outside of these values. The telephone circuit for ring trip detection further includes an integrator circuit (INT) that integrates the current supplied by the transducer during one or more full periods of the alternating line voltage. When the result of such an integration is different from zero, the detection circuit can inform the telephone exchange control equipment that the off-hook condition has taken place.

These and other features of the present invention will be understood upon reading of the following description along with the drawings.

DESCRIPTION OF THE PREFERRED EMBODIMENT

Figure 1:
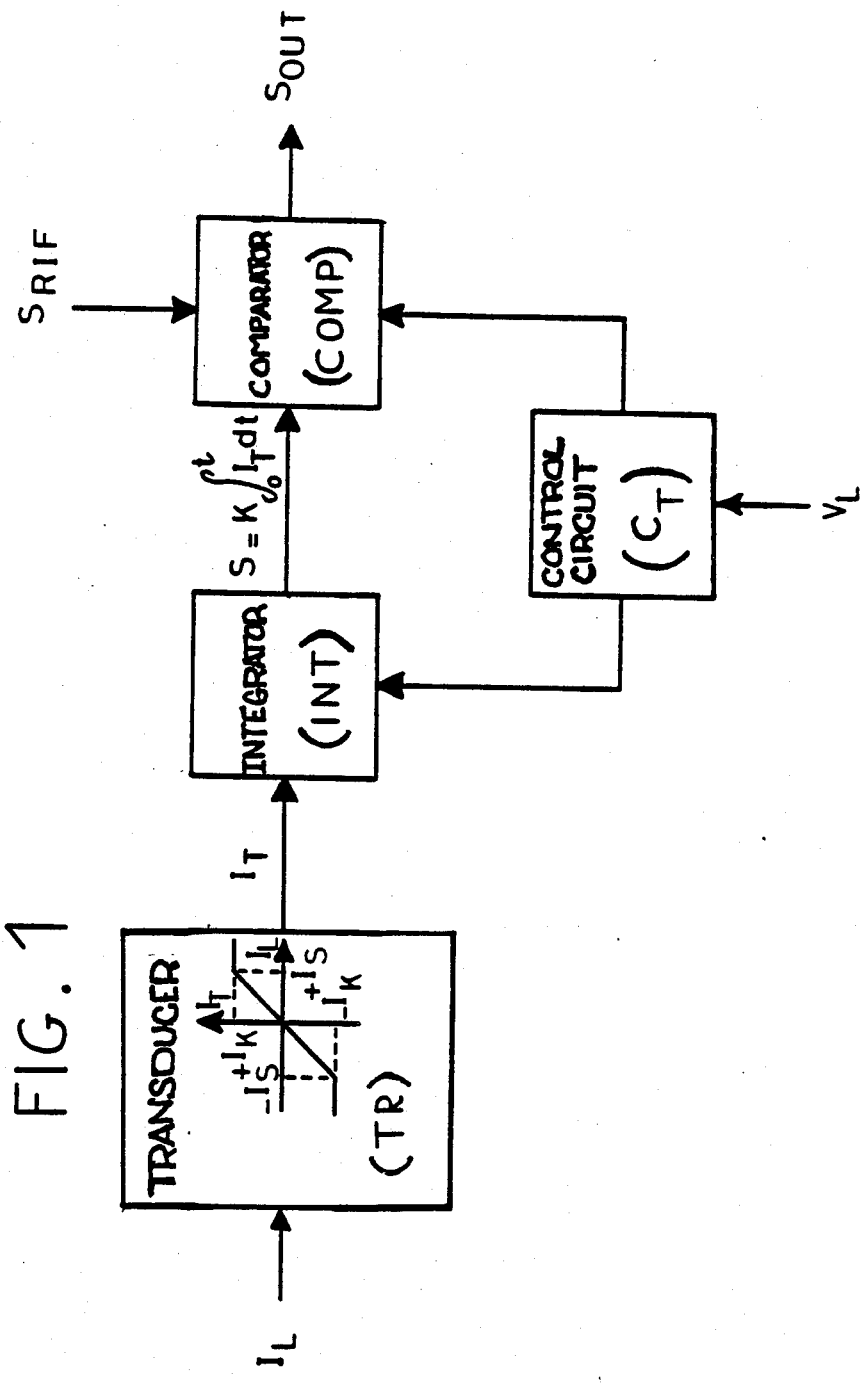
FIG. 1 shows a block diagram of a telephone circuit for the ring trip detection according to the invention.

According to the present invention, a telephone circuit for the ring trip detection includes a non-linear current transducer, represented in FIG. 1 by block TR, in which the current transfer characteristic is indicated. The current transducer is coupled to a user's telephone line, not represented in the figure, and is driven by the line current, $I_L$. According to the invention the transducer TR provides an output current, $I_T$, proportional to the line current $I_L$ for values of the line current included between two predetermined threshold values, the threshold values being opposite in sign and equal in absolute value and denoted by $+I_S$ and $-I_S$. Beyond the threshold values, the current $I_T$ supplied by the transducer is maintained constant and independent of variations of the line current $I_L$. The limit values, opposite in sign and equal in absolute value, between which the current $I_T$ can linearly vary, are indicated as $+I_K$ and $-I_K$.

A current integrator, INT, is coupled to the transducter TR. The current integrator generates a signal S having a value proportional to the value of the integral over time, starting from a predetermined instant, of the current $I_T$ supplied by the transducer TR wherein:

$$S = K \int_o^t I_T \cdot dt.$$

A control circuit means, $C_T$, connected to the integrator INT and driven by the user's line voltage, $V_L$, determines the integration intervals by means of control pulses that bring back, at predetermined instants, the current integrator to the initial conditions.

According to the present invention, the current $I_T$ is integrated over time intervals equal to one or more full periods of the alternating line voltage, the duration time of which coincides with that of the periods of the line current. In this way, the current defined integral value is different from zero only when there is a direct current component determined by the off-hook condition of the receiver that has shut off the conversation circuit on the line.

A comparator circuit, COMP, coupled to the integrator circuit, INT, and to the control circuit means, $C_T$, compares the signal S with a reference signal $S_{RIF}$ and generates, when the difference between the two signals resulting from the off-hook condition is different from zero and larger than a predetermined value, a signal $S_{OUT}$. The signal $S_{OUT}$ informs the exchange control equipment, not represented in the diagrams, of the off-hook condition, so that the same equipment interrupts the generation of the call signals. However, the comparator is enabled from the control circuit means $C_T$ to send the signal to the exchange control equipment only when the integration of the current $I_T$ has been defined by the control circuit means $C_T$. In fact, as has already been stated, the value of an integral over time of an alternating signal greatly varies during a period. Therefore, the integral can have intermediate values much higher than the final value, which can determine erroneously the interruption of the ringing signal.

Figure 2:
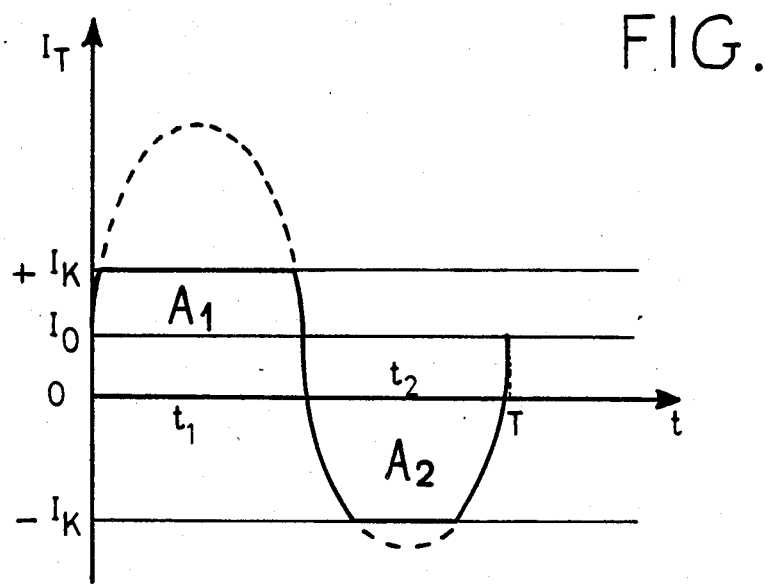
FIG. 2 shows the wave form of the current that is generated by a non-linear current transducer included in the detection circuit and coupled directly to the user's telephone line.

In FIG. 2, the wave form is represented for a time interval equal to a full period, T, of the output current $I_T$ of the transducer TR when, in the ringing phase, the off-hook condition has taken place and therefore a direct current $I_o$ is also on the line. Assuming a proportionality ratio equal to one between the currents $I_L$ and $I_T$ in the linear part of the transfer characteristic of the transducer, such wave form, that is indicated in the figure with a straight line, is, between the two limit values $+I_K$ and $-I_K$, an exact replica of that of the line current $I_L$. In FIG. 2, a dotted line shows the peaks of the user's line current that are suitably smoothed by the transducer. The limit values $+I_K$ and $-I_K$ are determined according to the characteristics of the line and of the apparatus coupled to the line and according to the level of the direct current $I_o$. $A_1$ and $A_2$ indicate the areas defined by the wave form of $I_T$ in the half-wave periods $t_1$ and $t_2$. Because of the direct current $I_o$, these areas and half-wave periods are found to be different from one another.

The signal S generated from the integrator circuit is proportional to the integral of the current $I_T$ or proportional to area along with the sign defined by its wave form. The signal S is a measure, when the integral is defined on a full period T by the control circuit means $C_T$, of the difference between the areas $A_1$ and $A_2$. The signal S has a value that is therefore different from zero only when the off-hook condition has taken place and the direct current $I_o$ is also on the line.

For a greater reliability, because the value of such a defined integral can, in fact, be different from zero even when the off-hook condition hasn't taken place, a detection threshold is determined by the comparator circuit that compares this value with a reference signal. Because of the non-linear transducer circuit TR, the problems that arise with monolithically integrated telephone circuits are completely eliminated. Independent of the peak values of the alternating line current $I_L$, the maximum values of the current $I_T$ supplied by the transducer circuit are always included within exact limits defined by its transfer characteristic. However, because the characteristic of the transducer within the two threshold values is linear, the detection sensitivity for low levels of line current is not limited and, therefore, a circuit according to the present invention can be utilized in any line condition. In that situation, when the threshold values are suitably selected and the characteristics of the user's line and terminal are known, the circuit operation can be optimized.

Figure 3:
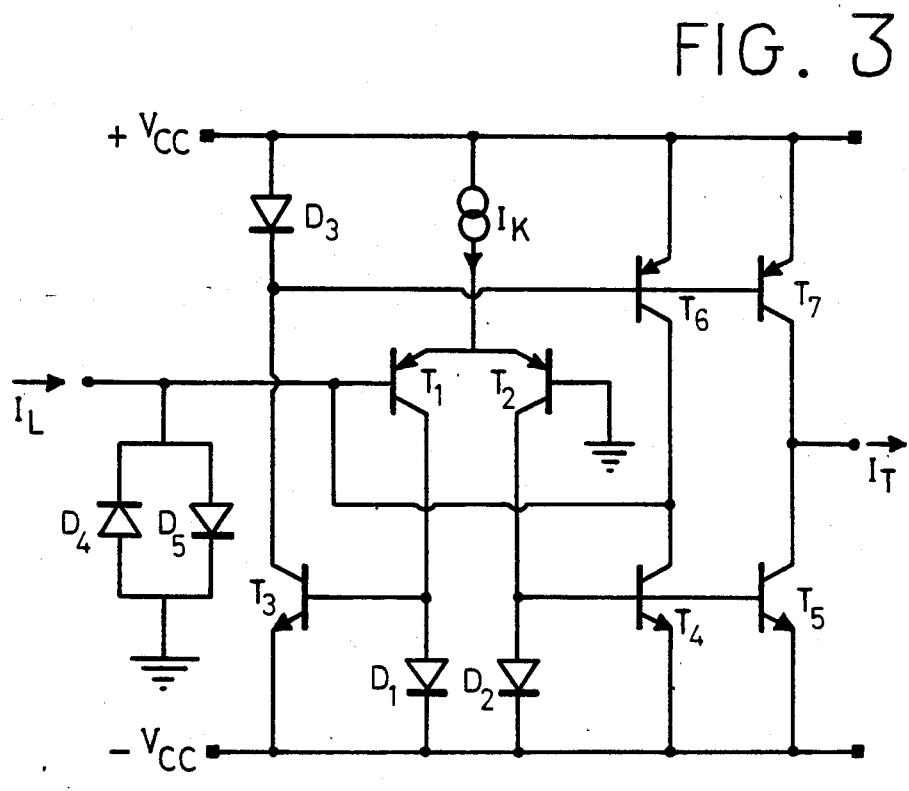
FIG. 3 illustrates a circuit diagram of a non-linear transducer circuit of the type included in a detection circuit according to the invention.

The circuit diagram of a non-linear transducer, which could be used to practice an off-hook detection circuit in conformity with the invention, is represented in FIG. 3. This circuit includes a differential circuit comprising a first and a second PNP transistor, $T_1$ and $T_2$, whose base terminals receive the input signals for the differential circuit. The base terminal of $T_1$ is the input of the transducer, to which the user's line current, $I_L$, is applied. The base terminal of $T_2$ is coupled to the ground connection, whose potential is intermediate between the potentials of the positive pole, $+V_{cc}$, and of the negative pole, $-V_{cc}$, of a supply voltage generator to which the transducer is coupled. The emitters of transistors $T_1$ and $T_2$ are coupled to $+V_{cc}$ through a constant current generator $I_K$. The collector of transistor $T_1$ is coupled to the base of a third transistor, $T_3$, of the NPN type, and to the anode of a first diode, $D_1$. The emitter of transistor $T_3$ and the cathode of $D_1$ are coupled to $-V_{cc}$. The collector of transistor $T_2$ is coupled to the bases of a fourth and a fifth transistor, $T_4$ and $T_5$, both of the NPN type, and to the anode of a second diode, $D_2$. The emitters of transistors $T_4$ and $T_5$ and the cathode of $D_2$ are connected to the $-V_{cc}$ terminal. The collector of transistor $T_3$ is coupled to the cathode of a third diode, $D_3$, and to the bases of a sixth and a seventh transistor, $T_6$ and $T_7$, both of the PNP type. The anode of diode $D_3$, and the emitters of transistors $T_6$ and $T_7$ are coupled to the $+V_{cc}$ terminal. The collector of transistor $T_6$ is coupled to the base of transistor $T_1$ and to the collector of transistor $T_4$. The collectors of transistor $T_5$ and $T_7$ are coupled together to form a terminal to which the output current $I_T$ of the transducer circuit is made available. Between the base of transistor $T_1$ and the ground potential, two diodes, $D_4$ and $D_5$ are inserted in parallel to each other, but in opposite orientation from one another. The function of the transducer circuit, as will be clear to a person skilled in the art, is determined by the current generator $I_K$ that imposes the maximum absolute value, precisely equal to $I_K$, of the output current $I_T$. The implementation of the INT integrator, included in a detection circuit in accordance with the invention, can instead be effected by means of a capacitor with a capacitance C, for which a plate is coupled to the ground and the other plate is coupled to the output of the transducer TR and to an input of the comparator COMP, the latter being implemented in a known manner. The two plates can be short-circuited through a switch controlled by the control circuit means $C_T$ by means of pulses at predetermined instants, spaced by one or more full periods of the line voltage (or current). The capacitor, which is discharged every period for example, is then progressively charged, in the following period, by the transducer output current $I_T$. Between the capacitor plates, a time varying voltage, $V_c$, is established, wherein:

$$V_c = \frac{1}{C} \int_o^t I_T \cdot dt$$

that can be used as signal S to be compared with a reference voltage $S_{RIF}$, by means of the comparator COMP. The control circuit means $C_T$ can be implemented by one skilled in the art as a circuit that is driven by the voltage of the user's line and wherein every period results in the generation of a pulse adapted to command the switch for the capacitor discharge and to enable the comparator circuit to send a detection signal to the exchange equipment. The control circuit can, for example, comprise a circuit known by the name of "zero crossing level circuit".

Although only one embodiment of the invention has been illustrated and described, it is obvious that many modifications are possible without departing from the scope of the invention itself. For example, the signal S could be generated as a pulse only at the end of the time interval for which the integration of the current $I_T$ is performed. In this way the detection signal generated by the comparator circuit would be sent to the exchange equipment, without further commands from the control circuit $C_T$ only at the end of the integration periods. The control circuit $C_T$ could then be driven by the line current itself, instead of the line voltage $V_T$.

The above description is included to illustrate the operation of the preferred embodiment and is not meant to limit the scope of the invention. The scope of the invention is to be limited only by the following claims. From the above description, many variations will be apparent to one skilled in the art that would yet be encompassed by the spirit and scope of the invention.

What is claimed is:

1. A telephone circuit for ring trip detection for operating as an interface between a user's telephone line and a user's line circuit under the control of an exchange control equipment, comprising:
   a current transducer (TR) coupled to said user's telephone line which supplies a current ($I_T$) proportional to a user's line current ($I_L$) for values of such current between two predetermined threshold values ($+I_S$, $-I_S$), said predetermined threshold values being opposite in sign and equal to absolute value, said current ($I_T$) supplied by said current transducer (TR) is maintained constant when said threshold values are reached even when said line current ($I_L$) varies beyond said threshold values;

a current integrator (INT) coupled to said current transducer (TR), said current integrator (INT) generating a signal (S) having a value proportional to a value of an integral over time of said current ($I_T$) supplied by said current transducer (TR), said integral being performed from a predetermined time over a time interval equal to at least one full period (T) of a voltage or a current of the user's line ($I_L$); and a comparator (COMP) for comparing said signal (S) generated by said current integrator (INT) with a reference signal ($S_{RIF}$), wherein when a value of said signal (S) generated by said current integrator (INT) exceeds a predetermined value of said reference signal ($S_{RIF}$) said comparator generates a signal informing the exchange control equipment that an off-hook can take place at the end of every time interval on which the integration of said current ($I_T$) supplied by said transducer (TR) is performed.

2. A telephone ring trip circuit for telephone apparatus actuated by a user's line current including a.c. and d.c. components comprising, in combination:

current transducer means for generating a first signal, said first signal being proportional to the magnitude of the instantaneous value of said user's line current up to a predetermined value thereof and independent of said user's line current above said predetermined value;

integrator means for generating an integrated signal comprising the integral of said first signal over a time period comprising at least one full period of said user's line current; and comparator means for generating a control signal when said integrated signal exceeds a predetermined threshold value.

3. A method for generating a ring trip control signal for a telephone apparatus actuated by a user's line current including a.c. and d.c. components, comprising the steps of:

generating a first signal which is proportional to the magnitude of the instantaneous value of said user's line current up to a predetermined value thereof and independent of said user's line current above said predetermined value;

integrating said first signal over a time period comprising at least one full period of said user's line current to provide a second signal which increases with said d.c. components of said user's line current; and generating a ring trip control signal when said second signal exceeds a predetermined threshold value.

* * * * *